(12) United States Patent
Motzkus et al.

(10) Patent No.: US 8,814,173 B2
(45) Date of Patent: Aug. 26, 2014

(54) SEAL AND SEAL ARRANGEMENT FOR CONFINING LEAKAGE FLOWS BETWEEN ADJACENT COMPONENTS OF TURBO-MACHINES AND GAS TURBINES

(75) Inventors: Thorsten Motzkus, Birmenstorf (CH); Urs Benz, Gipf-Oberfrick (CH)

(73) Assignee: Alstom Technology Ltd, Baden (CH)

( * ) Notice: Subject to any disclaimer, the term of this patent is extended or adjusted under 35 U.S.C. 154(b) by 682 days.

(21) Appl. No.: 12/978,804

(22) Filed: Dec. 27, 2010

(65) Prior Publication Data

US 2011/0150635 A1   Jun. 23, 2011

Related U.S. Application Data

(63) Continuation of application No. PCT/EP2009/057765, filed on Jun. 23, 2009.

(30) Foreign Application Priority Data

Jul. 1, 2008   (CH) ..................................... 1011/08

(51) Int. Cl.
*F16L 15/02*   (2006.01)
(52) U.S. Cl.
USPC .......................... 277/626; 277/627; 277/644
(58) Field of Classification Search
USPC ......... 277/644, 647, 648, 650, 653–654, 626, 277/627; 415/135, 138, 173.3, 173.2
See application file for complete search history.

(56) References Cited

U.S. PATENT DOCUMENTS

| | | | |
|---|---|---|---|
| 3,575,432 A * | 4/1971 | Taylor | ............................ 285/367 |
| 3,595,588 A | 7/1971 | Rode | |
| 3,869,222 A | 3/1975 | Rahnke et al. | |
| 5,076,591 A | 12/1991 | Gentile | |
| 7,451,989 B1 * | 11/2008 | Cornett et al. | ................. 277/626 |
| 7,530,574 B2 * | 5/2009 | Lah | ............................... 277/314 |
| 7,682,490 B2 * | 3/2010 | Lah | ............................... 202/242 |
| 2005/0057003 A1 | 3/2005 | Iguchi et al. | |

(Continued)

FOREIGN PATENT DOCUMENTS

DE   19503285   8/1996
DE   29810516   10/1998

(Continued)

OTHER PUBLICATIONS

Search Report for Swiss Patent App. No. 01011/08 (Nov. 3, 2008).

(Continued)

*Primary Examiner* — Gilbert Lee
(74) *Attorney, Agent, or Firm* — Buchanan Ingersoll & Rooney PC (57) ABSTRACT

A seal for stemming leakage flows between adjacent components, especially of a gas turbine, has an elastically deformable, thin-walled sealing element and a thin-walled cover element which is U-shaped in cross section and between its legs and its base partially accommodates the sealing element. The legs of the cover element are arranged in the sealing arrangement, which features the seal, between two oppositely disposed walls of the other component in a movable manner relative to these walls which, together with the sealing surface of the other component, form a groove which is U-shaped in cross section. Forces, which act laterally upon the seal, are absorbed by the cover element and via the legs are diverted into the other component so that the integrity of the seal is maintained even in the case of lateral forces.

17 Claims, 2 Drawing Sheets

(56) References Cited

U.S. PATENT DOCUMENTS

| | | | |
|---|---|---|---|
| 2005/0095123 A1 | 5/2005 | Taillant et al. | |
| 2008/0143059 A1* | 6/2008 | Lah | 277/653 |
| 2008/0309019 A1* | 12/2008 | Wolfe et al. | 277/420 |

FOREIGN PATENT DOCUMENTS

| | | | |
|---|---|---|---|
| EP | 1323894 | 7/2003 | |
| EP | 1378690 | 1/2004 | |
| EP | 1521036 | 4/2005 | |
| FR | 2031924 | 11/1970 | |
| GB | 732020 | 6/1955 | |
| GB | 2303888 | 3/1997 | |
| JP | 62243901 A * | 10/1987 | F01D 11/08 |
| WO | WO2010/000637 | 1/2010 | |

OTHER PUBLICATIONS

International Search Report for PCT Patent App. No. PCT/EP2009/057765 (Oct. 1, 2009).

* cited by examiner

SEAL AND SEAL ARRANGEMENT FOR CONFINING LEAKAGE FLOWS BETWEEN ADJACENT COMPONENTS OF TURBO-MACHINES AND GAS TURBINES

This application is a Continuation of, and claims priority under 35 U.S.C. §120 to, International App. No. PCT/EP2009/057765, filed 23 Jun. 2009, and claims priority therethrough under 35 U.S.C. §§119, 365 to Swiss App. No. 01011/08, filed 1 Jul. 2008, the entireties of which are incorporated by reference herein.

BACKGROUND

1. Field of Endeavor

The invention refers to a seal and sealing arrangement for stemming leakage flows between adjacent components of turbomachines, especially gas turbines, wherein the seal has an elongated, thin-walled sealing element which is elastically deformable in at least one transverse direction and which, in cross section, has the shape of a bent band.

2. Brief Description of the Related Art

In the installed state, the seal is arranged in a space, which is delimited by walls of the two components, in a pretensioned manner in at least one transverse direction in such a way that the at least one transverse direction extends perpendicularly to two oppositely disposed sealing surfaces, of which one is on a wall of the one component and the other is on a wall of the other component.

Such a seal and sealing arrangement are known from EP 1 378 690 A2. In the case of this seal, which is arranged in an open space which is delimited by two parallel sealing surfaces and a supporting wall which perpendicularly adjoins one of the sealing surfaces, the space being part of a gap which separates the two components from each other, the sealing element can have various cross-sectional shapes, of which one corresponds to a "C" (FIG. 3), another resembles a "U" in a center section (FIGS. 1, 2), adjoining the legs of which are two outwardly bent, round sections, and a further shape resembles an "E" (FIG. 4). Both in the case of the sealing element which is C-shaped in cross section and in the case of the sealing element which is E-shaped in cross section, an opening, which faces a high-pressure side of the gap, is located between the free ends in each case. There is an opening which faces the high-pressure side of the gap also in the case of the sealing element with a cross section which is U-shaped in the center section. This opening is located between the two outwardly bent, round end sections of the sealing element. Common to all the aforesaid cross-sectional shapes of the sealing element of the known seal is that in each case they have two contact regions, which bear against the sealing surfaces of the components, in the proximity of the free ends of the sealing element and also have a supporting region which bears against the supporting wall, wherein the supporting region is exposed to the low-pressure side of the gap.

The sealing element of the known seal is arranged in the space between the two components in a pretensioned manner so that, in the case of a, for example, thermally induced widening of the gap perpendicular to the oppositely disposed sealing surfaces, the sealing element is deformed in such a way that the respective opening is widened and the contact regions of the sealing element follow the sealing surfaces—which move away from each other—of the components. On the other hand, if in the case of a, for example, also thermally induced narrowing of the gap perpendicular to the oppositely disposed sealing surfaces, the sealing element is deformed in such a way that the respective opening is narrowed and the distance between the contact regions which bear against the sealing surfaces is reduced.

Since the opening of the sealing element of the known seal faces the high-pressure side of the gap and a surface section of the sealing element, which includes the supporting region, is exposed to the low-pressure side of the gap, forces result from the pressure difference, acting on the sealing element, which on the one hand increase the spring forces which arise as a result of elastic deformation of the sealing element and press the contact regions against the sealing surfaces of the construction elements, and on the other hand tightly press the supporting region against the supporting wall. The forces which result from the pressure difference between the high-pressure side and the low-pressure side of the gap act upon the contact regions of the sealing element in the same direction as the spring forces which arise as a result of elastic deformation of the sealing element. Consequently, the contact regions of the sealing element are also pressed against the sealing surfaces of the components if the spring forces are no longer effective as a result of excessively large gap-widening or material fatigue of the sealing element as a consequence of constantly changing deformation of the sealing element. Contingent upon the respective cross-sectional shape of the sealing element of the known seal, tight limits are set, however, to the elastic deformability of the sealing element so that they can only bridge such gaps which widen only a little in comparison to an initial gap width.

Whereas the sealing element—which is C-shaped in cross section, is U-shaped in the center section, or resembles an "E"—of the known seal maintains its sealing action in the case of a change of the relative position of the components perpendicular to its sealing surfaces which is not excessive, a neutralization of the sealing effect of the sealing element can occur if the components alter their relative position parallel to its sealing surface. In the case of such a relative change of position of the components, in particular the frictional resistance which acts between the contact regions of the sealing element and the sealing surfaces contributes to the sealing element being pressed more tightly against the supporting wall, depending on the direction of movement of the components, as a result of which a skewing of the sealing element is the consequence, or the sealing element is moved away from the supporting wall, as a result of which a change of position of the sealing element relative to the components is the consequence. Both consequences—skewing and change of position of the sealing element—have a disadvantageous effect on the sealing capacity of the known seal.

In order to reduce the frictional resistance between the sealing element and the components so that the sealing element, in the case of a relative change of position of the components parallel to its sealing surfaces, is less strongly inclined to skewing or to a change of position relative to the components, provision is made in a further embodiment (FIG. 5) of the known seal for welding or soldering two contact bodies onto the sealing element which is C-shaped in cross section, which contact bodies in their turn carry contact regions which bear against the sealing surfaces of the components. By using suitable materials for the contact bodies and for the sealing element which is C-shaped in cross section, the sealing surfaces of the components can slide along the contact regions of the contact bodies if the components move relative to each other parallel to their sealing surfaces without impairing the sealing performance, while at the same time the sealing element which is C-shaped in cross section furthermore has good elastic properties.

However, even this multipiece embodiment of the known seal cannot bridge larger gaps than the aforementioned one-piece embodiments of the known seal.

A seal with a one-piece sealing element, the cross-sectional shape of which consists of a U-shaped center section and two end sections which adjoin the U-shaped center section and are outwardly bent round, is also known from EP 1 323 894 A2. This known seal is arranged in a groove which is U-shaped in cross section which is arranged in one of two contiguous components of a gas turbine. The sealing element bears by a supporting region, which is located on the outer side of the U-shaped center section, against a supporting wall which is one of two oppositely disposed walls of the U-shaped component groove. The components have two oppositely disposed sealing surfaces, of which one is located on the bottom of the U-shaped groove. The sealing element is arranged in a pretensioned manner in a space between the two components so that the bent-round end sections bear by their respective outer side against the oppositely disposed sealing surfaces of the components. The wall of the U-shaped component groove which lies opposite the supporting wall has a substantial distance from the bent end sections of the sealing element. Consequently, the sealing element can move between the two oppositely disposed walls of the groove which is U-shaped in cross section by a degree which can lead to skewing of the sealing element if the components move correspondingly. Neither is this seal suitable for maintaining its sealing performance if a larger gap develops between the two components because the end sections of the sealing element then no longer bear, or do not bear tightly enough, against the sealing surfaces of the components.

From U.S. Pat. No. 4,854,600 A, a seal which is exposed to a pressure difference with an annular sealing element is known, which sealing element in cross section has the shape of a repeatedly bent band which has a plurality of consecutive bends with alternating bend directions, where each bend is the cross-sectional shape of an associated bent wall section of the sealing element. In one embodiment (FIGS. 1, 8, 9, 10), the sealing element has an "S" shape in cross section, in which it has two consecutive, oppositely bent wall sections which are interconnected by a wall section which extends transversely to the direction of movement. An end section, which has the respective free end, adjoins each of the bent wall sections and has a bend in each case, the convex outer side of which bears against a sealing surface of the respective component. The seal is arranged in a pretensioned manner in an annular space between two concentrically arranged components, wherein the two sealing surfaces of the components are oriented pointing either axially or radially. The sealing element is elastically deformable perpendicularly to the sealing surfaces, wherein it is elastically deformable to a greater extent in this direction than, for example, a sealing element which is C-shaped in cross section, but during movements of the components parallel to its sealing surfaces is exposed to the risk of its position changing, just like a sealing element which is C-shaped in cross section.

In another embodiment (FIGS. 4, 5), the sealing element consists of a section which is S-shaped in cross section and a section which is rectilinear in cross section which is connected to one end of the S-shaped section by welding and serves for preventing the S-shaped section of the annular sealing element from rotating. The rectilinear section is the cross section of a flat ring.

In a further embodiment (FIG. 3), the sealing element has more than two consecutive bent wall sections and has an end section which is rectilinear in cross section and has a convex surface region which bears against a sealing surface of the associated component. This embodiment has a high elastic deformability perpendicular to the parallel sealing surfaces of the components. Consequently, this embodiment can be used where greater movements of the components perpendicular to its sealing surfaces are to be expected. However, this embodiment of the known seal is also unfavorably loaded during a movement of the components parallel to its sealing surfaces so that as a result of such movements an undesirable skewing or change of position of the sealing element can occur with disadvantageous effects upon the sealing performance.

An annular seal is known from U.S. Pat. No. 5,630,593 A, in which the elastically deformable sealing element can be single-layered or multilayered and is either U-shaped in cross section with outwards bent-round end sections (FIGS. 2, 3, 4) or is E-shaped (FIGS. 6, 10) with three consecutive bent wall sections and two end sections which are bent round outwards. The sealing element can be exposed to a pressure difference in such a way that the outwards bent-round end sections are pressed more strongly against the oppositely disposed sealing surfaces of the components. The multilayered construction has a higher rigidity than the single-layered construction. In one of the material layers of the sealing element, provision may be made for slots which are spaced apart in the circumferential direction, in order to increase the flexibility of the sealing element. This seal is suitable for bridging gaps which vary relatively little in their width between two components. The sealing performance of this known seal, however, is also put at risk if the components move parallel to its sealing surfaces.

Also known from experience are so-called double-E seals which consist of two sealing elements which are E-shaped in cross section, these being interconnected by a cover strip, which is band-like in cross section, by welding or soldering. This type of seal, just like the single sealing element which is E-shaped in cross section, can bridge larger gaps than the sealing element which is C-shaped in cross section. The double-E seal is certainly less susceptible than the single-E seal to skewing or to displacement during relative movements of the components oriented parallel to the sealing surfaces. Larger relative movements of the components parallel to its sealing surfaces, however, also impair the positional stability and resistance to wear of the double-E seal so that, during larger relative movements of the components parallel to its sealing surfaces, failure of the double-E seal can occur. If the double-E seal, for example, is used where the cooling air plenum is to be sealed against the combustion plenum of gas turbine combustors, leakages into the combustion chamber of the combustor can occur as a result of larger relative movements of the components, which are to be sealed against each other, parallel to its sealing surfaces, as a result of which performance and efficiency losses and also emissions and, in the most serious case, combustion instabilities, may be the consequence. On account of the loss of sealing, premature readjustment of the operating parameters of the gas turbine is then frequently required.

SUMMARY

One of numerous aspects of the present invention includes a generic-type seal characterized by a high elastic deformability in a direction transverse to the sealing surfaces of the components, and by a high resistance to deformations and changes of position during relative movements of the components parallel to its sealing surfaces, and with a high resistance to wear, which can provide a satisfactory sealing performance which is as prolonged as possible. In addition, a sealing arrangement can achieve a stable position of the seal even during relative movements of the components which are oriented parallel to the sealing surfaces of the components, and prevents skewing of the seal.

With such a seal and sealing arrangement, the integrity of the seal is ensured even during relatively large relative movements of the components. At the same time, the seal has a high resistance to wear and therefore guarantees a consistently good sealing performance over a longer period of time. On account of these characteristics, seals embodying principles of the present invention can also be used in such places of a gas turbine in which C-seals were previously used, these certainly also having a good wear behavior but having only a low elastic compliance.

BRIEF DESCRIPTION OF THE DRAWINGS

Further details and embodiment types of the invention are shown in the attached drawings and are described in more detail in the following text. In the drawing

DETAILED DESCRIPTION OF EXEMPLARY EMBODIMENTS

A seal, as is shown in FIGS. 1 to 4, has an elastically deformable, thin-walled sealing element 1 formed of metal which in cross section has the shape of a bent band, having two adjacent rows of consecutive bent wall sections 2 which in each case are interconnected by a transversely extending wall section 3. In the exemplary embodiment which is shown, in each row there are six bent wall sections 2 which are interconnected by all together five transversely extending wall sections 3. This number of bent wall sections 2 in each row and the associated number of transversely extending wall sections 3 are only exemplary. The number could also be greater or smaller since they have an influence upon the desired extent of the elastic deformability of the sealing element 1.

Figure 1:
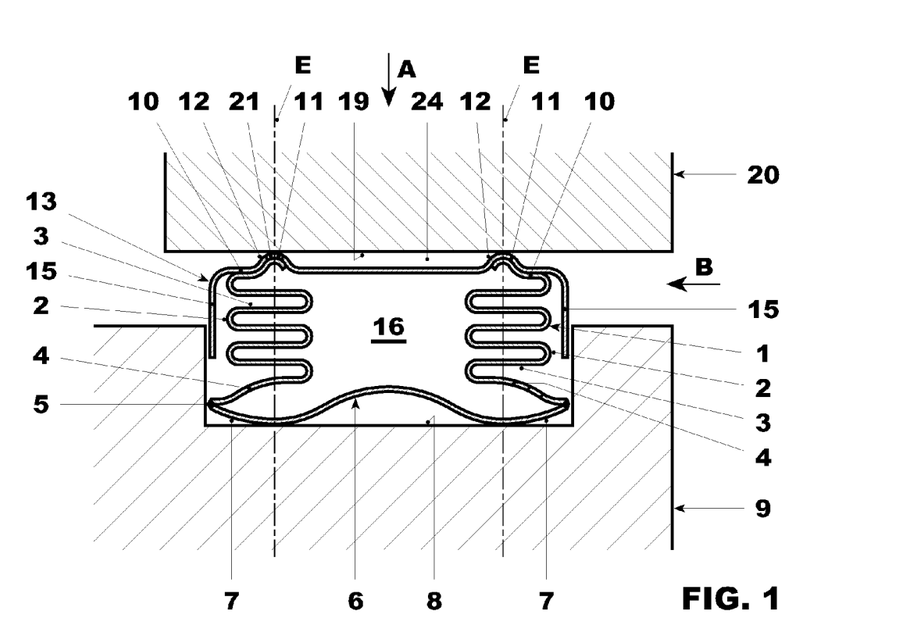
FIG. 1 shows in a section through a seal and a sealing arrangement according to an exemplary embodiment of the invention, wherein the section is directed along the line I-I in FIG. 3 or FIG. 4.

As is evident from FIG. 1, the two rows of consecutive wall sections 2 and the transversely extending wall sections 3 which connect them are arranged so that in each row all the transversely extending wall sections 3 intersect a common center plane E in each case and the two center planes E, E are parallel to each other. From the lowermost bent wall section 2 of each row in FIG. 1, which, if the consecutive wall sections 2 are counted from the bottom upwards, can also be referred to as the "first" bent wall section 2, extends a wall section 4 in each case which, by its end which is remote from the bent wall section 2, is connected in a fixed manner by a weld seam 5 to one end in each case of a cover strip 6, formed of metal, which is band-shaped in cross section and also thin-walled. Instead of connecting the wall sections 4 of the sealing element 1 to the cover strip 6 by welding, it can also be connected to the cover strip 6 in a fixed manner by hard-soldering.

Figure 2:
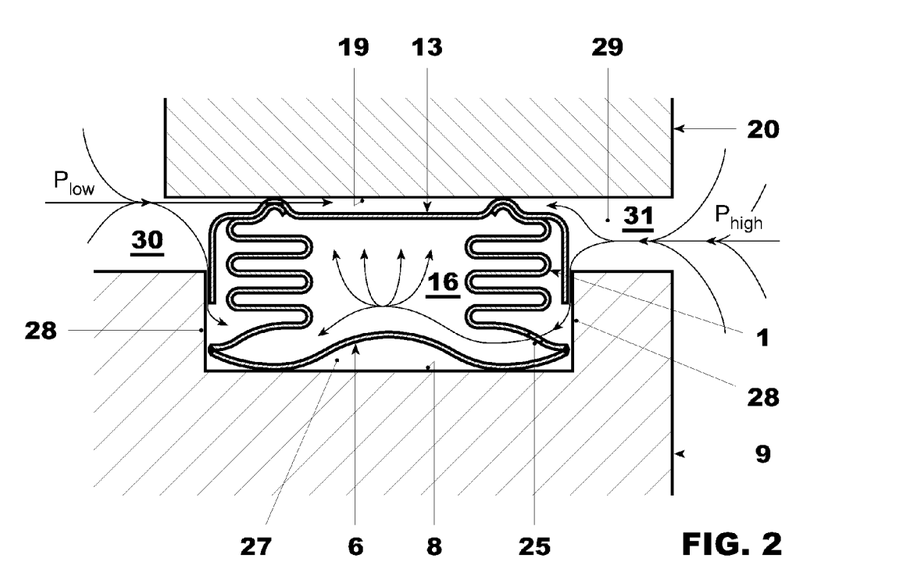
FIG. 2 shows the same sectional view as in FIG. 1, wherein, however, the pressure spread in the sealing arrangement from the high-pressure side $P_{high}$ of the seal and from the low-pressure side $P_{low}$ of the seal is shown schematically by means of arrows.

As is evident from FIGS. 1 and 2, the cover strip 6 is bent in a wave-like manner so that two convex surface regions 7, which are at a lateral distance from each other, are created, and in each case bear partially, preferably linearly, with sealing effect against a sealing surface 8 of a component 9. The cross-sectional shape of the cover strip 6 which is shown in the drawings is only exemplary. In other exemplary embodiments, the cover strip 6 can also be essentially straight in cross section and in this case the convex surface regions 7 of the cover strip 6 which bear against the sealing surface 8 can then be formed by beads.

From the uppermost bent wall section 2 of each row in FIG. 1, which, if the consecutive wall sections 2 are counted from the bottom upwards, can also be referred to as the "last" bent wall section 2, extends an end section 10 which is band-like in cross section and in the proximity of its free end has a convex surface region 11 which bears with sealing effect against the concave inner side of a respective bead 12, which is part of a thin-walled cover element 13, formed of metal, which is U-shaped in cross section. The cover element 13 has two parallel legs 15 extending from a base 14 and pointing downwards in FIG. 1, which legs, together with the base 14, delimit a downwards open space or recess 16 in which the sealing element 1 is partially accommodated, as is evident in FIGS. 1 and 2. The sealing element 1 and the cover element 13 are interconnected in a fixed manner by welding or hard-soldering.

Figure 4:
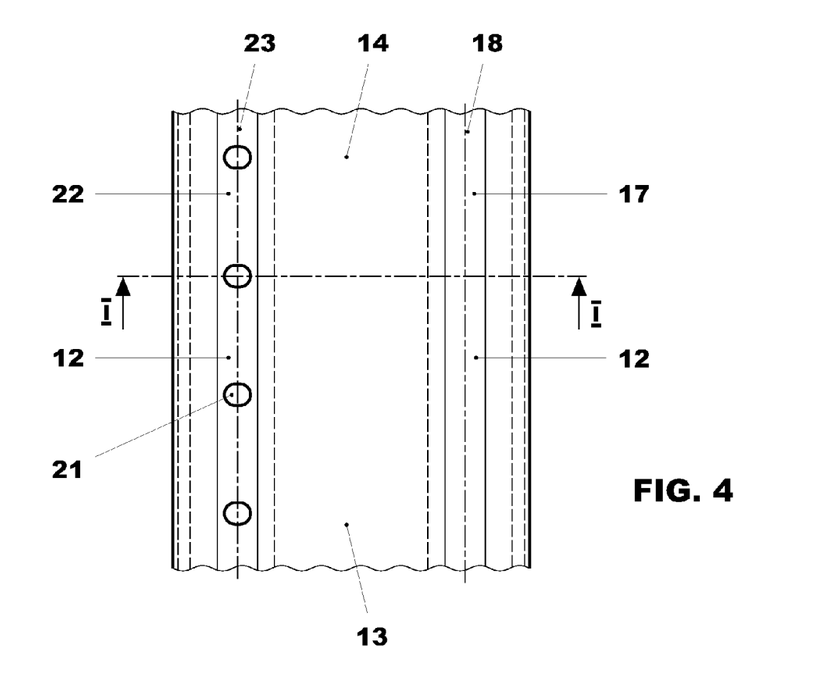
FIG. 4 shows a plan view of a section of the seal in the direction of the arrow A in FIG. 1, wherein, for the sake of an improved view, the components are omitted.

The convex outer side of the right-hand bead 12 in FIGS. 1 and 2 is a strip-like raised surface section 17 on the outer side of the base 14 of the cover element 13 which faces away from the space 16. This raised surface section bears with sealing effect against the sealing surface 19 of a further component 20 along an uninterrupted sealing line 18 which extends perpendicularly to the plane of the drawing. The sealing line 18 is shown in FIG. 4 as a broken line.

The concave outer side of the left-hand bead 12 of the cover element 13 in FIGS. 1 and 2 lies in a strip-like region on the outer side of the base 14, which region has a lateral distance from the right-hand bead 12 in FIGS. 1 and 2. The left-hand bead 12 has a plurality of openings 21 which are spaced apart in the longitudinal direction and between which lie raised surface sections 22 which bear with sealing effect against the sealing surface 19 of the component 20 along a sealing line 23, which in FIG. 4 is shown by broken lines, and is interrupted by the openings 21. The openings 21 are covered on the inner side of the base 14 of the cover element 13 which faces the space 16 by the convex surface region 11 of the base 14 and are therefore sealed tight towards the space 16. Each opening 21 creates a flow passage which is delimited by the sealing surface 19, the cover element 13 and the convex surface region 11 of the sealing element 1 and which connects a space 24, which is enclosed between the sealing lines 18 and 23, the sealing surface 19 and the outer side of the base 14 of the cover element, to the outside environment of the seal which in FIGS. 1, 2 and 4 lies to the left of the sealing line 23.

In the right-hand wall section 4 in FIG. 1, provision is made for a plurality of openings 25 which are at distances from each other. The openings 25 connect the space 16 in the interior of the seal to the outside environment of the seal which in FIGS. 1, 2 and 4 lies to the right of the sealing line 18.

Figure 3:
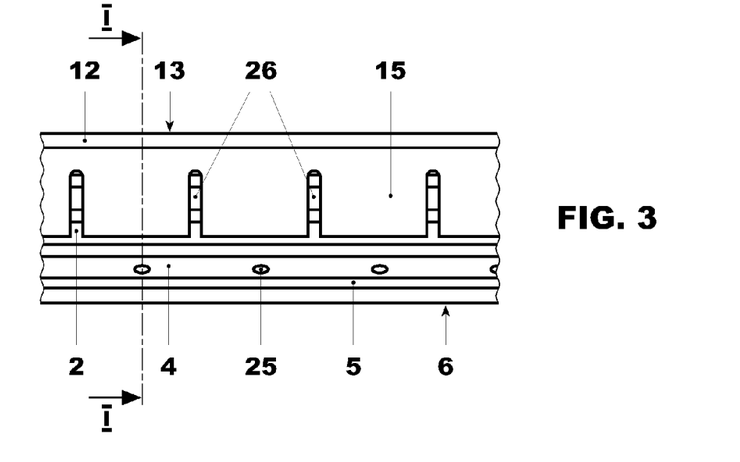
FIG. 3 shows a side view of a section of the seal in the direction of the arrow B in FIG. 1, wherein, for the sake of an improved view, the components are omitted.

As is evident from FIG. 3, a plurality of slots 26 are located in the legs 15 of the cover element 13. The slots 26 extend from the free end of the legs 15 in the direction towards the base 14 of the cover element 13. The slots 26 make it possible for the cover element 13 to also be elastically, flexurally deformable in the plane of the drawing of FIG. 3.

The seal is part of a sealing arrangement, with which are associated the two components 9 and 20, the parallel sealing surfaces 8 or 19 of which lie opposite each other. In the component 9, there is a groove 27 which is U-shaped in cross section and formed by two oppositely disposed walls 28 of the component 9 and its sealing surface 8.

As is evident from FIGS. 1 and 2, the seal is arranged in the space which is delimited by the oppositely disposed walls 28 and the oppositely disposed sealing surfaces 8 and 19 of the components 9 or 20, the space being part of a gap 29 which extends between the components 9 and 20, is variable in its width, and in the exemplary embodiment which is shown has two spaced-apart outlets 30 and 31, between which the seal is arranged. Via the outlet 30, the gap 29 is in communication with a region which contains a gaseous medium of low pressure $P_{low}$, and via the outlet 31 the gap 29 is in communication with a region which contains a gaseous medium of higher pressure $P_{high}$. The task of the seal is to seal the two components 9 and 20 against each other by it preventing a leakage flow from the high-pressure region, through the gap 29, to the lower pressure region.

In a gas turbine, the components 9 and 20, which are formed of metal, are exposed to different thermal loads, for example if they are parts of a combustor and on one side are exposed to compressed cooling air for the combustor and on the other side are exposed to hot combustion gases from the combustor. As a result of thermal load of the components 9 and 20, deformations occur, being manifested in relative movements of the components 9, 20 perpendicular to their sealing surfaces 8 or 19, but also in relative movements parallel to their sealing surfaces 8 or 19. As a result of relative movements of the components perpendicular to their sealing surfaces the width of the gap 29 alters correspondingly. On account of the geometry and the elastic material properties of the sealing element 1, the sealing element 1 is elastically deformable primarily in the transverse direction, that is to say parallel to the center planes E, E.

In the exemplary embodiment which is shown, the sealing element 1 is shown in a partially compressed state which at the same time represents the installed state of the seal before or after an operating cycle of the gas turbine. In this state, the legs 15 of the cover element 13 project into the U-shaped groove 27, wherein they have a small lateral clearance in relation to the oppositely disposed walls 28 of the component 9 which are adjacent to them. The legs 15 of the cover element 13 can therefore move parallel to the walls 28 and slightly perpendicularly to these walls, wherein both directions of movement can also overlap.

With widening of the gap, the seal is increasingly relaxed, wherein the cover element 13 moves further away from the cover strip 6. On the other hand, with narrowing of the gap, the sealing element 1 is more tightly compressed, wherein the cover element 13 comes closer to the cover strip 6. In both cases, the convex surface regions 7 of the cover strip 6 and the raised surface sections 17 and 22 of the cover element 13 bear against the respective sealing surface 8 or 19.

During operation of the gas turbine, gas from the high-pressure side of the seal flows through the openings 25 into the space 16. Through the flow passages which are formed by the opening 21, gas flows from the low-pressure side of the seal into the space 24. The forces which result from the pressure difference between the space 24 and the space 16 act upon the cover element 13 in the same direction as the spring forces which arise as a result of the compression of the sealing element 1. This has the result that if the gap 29 widens so much that the elastic compression of the sealing element 1 is completely neutralized, the forces which result from the pressure difference between the space 16 and the space 24 continue to press the cover element tightly against the sealing surface 19 of the component 20 along the sealing lines 18 and 23.

The pressure distribution which is established inside and outside the seal during operation of the gas turbine is shown schematically by arrows in FIG. 2.

With such a pressure distribution, on the underside of the cover strip 6 to the left of the point against which the right-hand surface region 7 bears against the sealing surface 8 in FIGS. 1 and 2, a lower pressure prevails than in the space 16. The forces which result from this pressure difference act upon the cover strip 6 in such a way that the surface regions 7 are pressed against the sealing surface 8, even if the spring forces which result from the compression of the sealing element 1 are neutralized.

An excessively large widening of the gap which leads to the elastic compression of the sealing element being neutralized is not the rule during normal operation of the gas turbine. It can occur in extreme exceptional circumstances. Since the seal even in these situations continues to reliably seal the components 9 and 20 against each other because, as described above, it bases its sealing performance not only on the presence of spring forces but also utilizes the pressure difference which prevails between the high-pressure side and the low-pressure side of the seal, the seal has certain emergency characteristics.

The dimensions of the seal and of the U-shaped groove 27 are arrived at so that on the one hand the legs 15 of the cover element 13 do not leave the U-shaped groove 27 even when, as a result of a very large widening of the gap, the elastic compression of the sealing element is neutralized and the seal derives its sealing performance exclusively from the pressure difference between the high-pressure side and the low-pressure side of the seal. On the other hand, the legs 15 of the cover element 13 cannot sink so deep into the U-shaped groove 27 that in the case of the most extreme narrowing of the gap the components 9 and 20 would be prevented from abutting by the seal. The lateral overlapping of the legs 15 of the cover element 13 by the walls 28 over the entire range of maximum possible gap widths serves to ensure that the cover element 13 can be laterally supported via its legs 15 against the walls 28 of the component 9 if the components 9 and 20 move parallel to their sealing surfaces in the case of any gap width within the maximum possible range. If, for example, the component 20 moves relative to the component 9 to the right in FIGS. 1 and 2, the cover element 13 is carried along by the component 20 until the right-hand leg 15 bears against the right-hand wall 28 of the component 9. If the component 20 then continues its movement in this direction, the sealing surface 19 slides along the raised surface sections 17 and 22 while these continue to remain in sealing contact with the sealing surface 19 along the sealing lines 18 and 23. The lateral forces which act upon the seal during this process are largely absorbed exclusively by the cover element 13 and are diverted into the component 9 via the leg 15 which is in contact with the corresponding wall 28. A possibly occurring lateral deformation of the sealing element 1 in this case is minimal.

The elastic deformability of the sealing element in the main direction which points perpendicularly to the sealing surfaces is not noticeably impaired as a result of the one leg 15 bearing against the corresponding wall 28. Displacement or skewing of the seal, which impairs the sealing performance of the seal, is excluded. This equally applies if the component 20 moves in the opposite direction or if the component 9 moves relative to the component 20 parallel to the sealing surfaces.

It can be important for the described function of the seal that, in the relaxed state of the sealing element 1, a part of the sealing element 1 is outside the space 16 which is delimited by the legs 15 and the base 14 of the cover element 13.

The cover element 13 and the sealing element 1 can be produced from the same metal or from different metals. The use of different metals enables the choice to be made so that in the best possible way the cover element 13 fulfills its supporting and sliding functions and the sealing element fulfills its elastic deformability. Also, the material of the cover strip, with regard to its function, can be selected to constantly bear against the sealing surface 8 with sealing effect. Since only the cover element 13 and the cover strip 6 have contact with the metal components 9, 20 which are to be sealed, particularly wear-resistant materials are selected for the cover element and the cover strip. In the exemplary embodiment, the seal is exposed to hot combustion gases. Consequently, all the materials of the seal are resistant to high temperatures.

The seal can be formed of one or more straight pieces, as are joined together to form a longer piece, or can be formed of a closed ring or ring segments which are assembled together to form a closed ring. If the seal is in the form of a ring, the slots 26 particularly contribute towards being able to impart to the cover element 13 of the seal a curved shape.

Whereas the invention was described primarily based on the exemplary embodiment which is represented in FIGS. 1 to 4, modifications are possible without abandoning the inventive idea. For example, instead of a sealing element which has two rows of bent wall sections, a sealing element with only one row of bent wall sections can also be used. Such a sealing element can then have the shape of an E-seal.

LIST OF DESIGNATIONS

1 Sealing element
2 Bent wall sections
3 Transversely extending wall sections
4 Wall section
5 Weld seam
6 Cover strip
7 Convex surface region
8 Sealing surface
9 Component
10 End section
11 Convex surface region
12 Bead
13 Cover element
14 Base
15 Leg
16 Space
17 Raised surface section
18 Sealing line
19 Sealing surface
20 Component
21 Openings
22 Raised surface sections
23 Sealing line
24 Space
25 Openings
26 Slots
27 U-shaped groove
28 Walls
29 Gap
30 Outlet
31 Outlet

| List of designations | |
|---|---|
| 1 | Sealing element |
| 2 | Bent wall sections |
| 3 | Transversely extending wall sections |
| 4 | Wall section |
| 5 | Weld seam |
| 6 | Cover strip |
| 7 | Convex surface region |
| 8 | Sealing surface |
| 9 | Component |
| 10 | End section |
| 11 | Convex surface region |
| 12 | Bead |
| 13 | Cover element |
| 14 | Base |
| 15 | Leg |
| 16 | Space |
| 17 | Raised surface section |
| 18 | Sealing line |
| 19 | Sealing surface |
| 20 | Component |
| 21 | Openings |
| 22 | Raised surface sections |
| 23 | Sealing line |
| 24 | Space |
| 25 | Openings |
| 26 | Slots |
| 27 | U-shaped groove |
| 28 | Walls |
| 29 | Gap |
| 30 | Outlet |
| 31 | Outlet |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A seal for stemming leakage flows between adjacent components of turbomachines, the seal comprising:
an elongated, thin-walled sealing element which is elastically deformable in at least one transverse direction and in cross section has the shape of a bent band;
an elongated, thin-walled cover element having a U-shaped cross section, the U-shape having legs and a base, the legs and the base delimiting a recess in which the sealing element is positioned, wherein:
the sealing element has a relaxed state in which a portion of the sealing element is outside said recess;
the sealing element has a cross sectional shape of a repeatedly bent band which has a plurality of consecutive bends with alternating bend directions; and
each bend is the cross-sectional shape of an associated bent wall section of the sealing element;
the sealing element includes a plurality of transversely extending wall sections;

the sealing element has two adjacent rows of consecutive bent wall sections, two consecutive bent wall sections of each row are connected by one transversely extending wall section, and in each row all the transversely extending wall sections intersect a common center plane;

the two adjacent rows each define a center plane, the center planes being parallel to each other; and the seal further comprises a thin-walled cover strip which has a band-like cross section and extends between two of said wall sections, both rows of the bent wall sections being connected by the cover strip, and the cover strip has at least one convex surface region oriented away from the recess configured and arranged to at least partially bear against a sealing surface of the other component.

2. The seal as claimed in claim 1, wherein the cover element base has an outer side which faces away from the recess has and a strip-like, raised surface section on the base outer side configured and arranged to bear against a sealing surface of one of the components.

3. The seal as claimed in claim 2, wherein:

the outer side of the cover element base has a strip-like region which extends at a lateral distance from the strip-like, raised surface section, the strip-like region including a plurality of spaced-apart, raised surface sections positioned to bear against the sealing surface of one component;

the strip-like region comprises a plurality of raised surface sections; and a flow passage for low-pressure fluid is delimited at least by the sealing surface of the one component and the cover element, the flow passage being located between at least two adjacent, raised surface sections of the strip-like region.

4. The seal as claimed in claim 1, wherein:

each two consecutive bent wall sections of the sealing element are connected by one of the transversely wall sections; and all the transversely extending wall sections intersect a common center plane.

5. The seal as claimed in claim 1, wherein:

the cover element base includes an inner side oriented toward the recess; and each row of bent wall sections includes a last bent wall section, and an end section adjoining the last bent wall section having a free end, the end section has a band-like cross section, and the end section at least partially bears tightly against the cover element base inner side.

6. The seal as claimed in claim 5, further comprising:

a wall section connecting the cover strip to a first bent wall section of a row of bent wall sections, said wall section including at least one opening for the passage of high-pressure fluid.

7. The seal as claimed in claim 1, wherein at least one of the sealing element and the cover element is formed of metal.

8. The seal as claimed in claim 7, wherein at least one of the sealing element and the cover element is resistant to high temperatures.

9. The seal as claimed in claim 1, wherein the sealing element and the cover element are formed of different metals.

10. The seal as claimed in claim 1, wherein the sealing element and the cover element are interconnected in a fixed and gastight manner by welding or soldering.

11. The seal as claimed in claim 1, wherein:

the cover element legs each include a free end; and at least one of the cover element legs includes at least one slot which extends from a leg free end towards the cover element base.

12. A sealing arrangement for stemming leakage flows between adjacent components of turbomachines, the sealing arrangement comprising:

first and second adjacent components of a turbomachine each having a wall, the walls together delimiting a space, each of said walls defining one of two oppositely disposed sealing surfaces;

wherein a first component of said two adjacent components comprises two oppositely disposed walls, said oppositely disposed walls forming a U-shaped groove with the wall of the second component;

a seal having an elongated, thin-walled sealing element which is elastically deformable in at least one transverse direction and having a cross sectional shape of a bent band;

wherein the seal is arranged in the space in a pretensioned manner in the at least one transverse direction in such a way that the at least one transverse direction extends perpendicularly to the two oppositely disposed sealing surfaces;

an elongated, thin-walled cover element, the cover element being U-shaped in cross section, the U-shape comprising two legs, a base, and a recess between the legs and the base in which the sealing element is positioned;

wherein, in a relaxed state of the sealing element, a portion of the sealing element is outside of the recess; wherein the two legs are arranged between the two oppositely disposed walls of the first component, the two legs being movable relative to the two oppositely disposed walls, wherein the space delimited by the walls of the two components is part of a gap which extends between the two components and comprises at least two spaced-apart outlets between which the seal is positioned, wherein one of the gap outlets is in communication with a region which contains high-pressure fluid and the other gap outlet is in communication with a region which contains low-pressure fluid; at least one portion of the outer surface of the cover element base is exposed to low-pressure fluid and at least one portion of the inner surface of the cover element base is exposed to high-pressure fluid, and wherein the difference in pressure between the low-pressure fluid and the high-pressure fluid creating a force which acts upon the cover element to press the cover element against the sealing surface of the second component.

13. The sealing arrangement as claimed in claim 12, wherein the two legs of the cover element are arranged with a lateral clearance between the two oppositely disposed walls of the first component.

14. The sealing arrangement as claimed in claim 12, wherein at least a portion an outer surface of the cover element base bears against the sealing surface of the second component.

15. The sealing arrangement as claimed in claim 12, wherein:

the turbomachine is a gas turbine having a combustor; and the components are parts of the combustor.

16. The sealing arrangement as claimed in claim 12, wherein the high-pressure fluid is a gas of relatively low temperature and the low-pressure fluid is a gas of relatively high temperature.

17. A turbomachine comprising:
two adjacent components, each having a wall, the walls together delimiting a space; and
a sealing arrangement according to claim 1 positioned in the space between the two components.

* * * * *